(12) United States Patent
Klarstrom et al.

(10) Patent No.: US 9,551,051 B2
(45) Date of Patent: *Jan. 24, 2017

(54) WELDABLE OXIDATION RESISTANT NICKEL-IRON-CHROMIUM ALUMINUM ALLOY

(71) Applicant: Haynes International, Inc., Kokomo, IN (US)

(72) Inventors: Dwaine L. Klarstrom, Kokomo, IN (US); Steven J. Matthews, Greentown, IN (US); Venkat R. Ishwar, Carmel, IN (US)

(73) Assignee: Haynes International, Inc., Kokomo, IN (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/940,831

(22) Filed: Jul. 12, 2013

(65) Prior Publication Data

US 2013/0294964 A1 Nov. 7, 2013

Related U.S. Application Data

(63) Continuation-in-part of application No. 12/001,528, filed on Dec. 12, 2007, now Pat. No. 8,506,883.

(51) Int. Cl.
  *C22C 19/05* (2006.01)
  *C22C 30/00* (2006.01)
  *C22F 1/10* (2006.01)
  *B23K 35/30* (2006.01)

(52) U.S. Cl.
  CPC ........... *C22C 30/00* (2013.01); *B23K 35/3033* (2013.01); *C22C 19/05* (2013.01); *C22C 19/055* (2013.01); *C22C 19/058* (2013.01); *C22F 1/10* (2013.01)

(58) Field of Classification Search
  CPC ...... C22C 19/055; C22C 19/058; C22C 30/00; C22F 1/10
  See application file for complete search history.

(56) References Cited

U.S. PATENT DOCUMENTS

| 4,010,309 | A | 3/1977 | Petersen |
| 4,460,542 | A | 7/1984 | Herchenroeder |
| 4,671,931 | A | 6/1987 | Herchenroeder et al. |
| 5,403,547 | A | 4/1995 | Smith et al. |
| 5,660,938 | A | 8/1997 | Sato et al. |
| 5,980,821 | A | 11/1999 | Brill |
| 7,736,618 | B2 | 6/2010 | Redlingshoefer et al. |
| 8,506,883 | B2 * | 8/2013 | Klarstrom et al. ........... 420/443 |

FOREIGN PATENT DOCUMENTS

| CN | 1258756 A | 7/2000 |
| EP | 0549286 | 6/1993 |
| EP | 0838533 | 4/1998 |
| GB | 1512984 | 6/1978 |
| JP | 05098397 | 4/1993 |
| JP | 06271993 | 9/1994 |
| JP | 10053841 | 2/1998 |
| JP | 11012669 | 1/1999 |

OTHER PUBLICATIONS

Abstract and English Translation of Kihira (JP 10-053841) (1998).
Abstract and English Translation of Chikazaki et al. (JP 11-012669) (1999).

* cited by examiner

*Primary Examiner* — Jessee Roe
(74) *Attorney, Agent, or Firm* — Buchanan Ingersoll & Rooney PC

(57) ABSTRACT

A weldable, high temperature oxidation resistant alloy with low solidification crack sensitivity and good resistance to strain age cracking. The alloy contains by weight percent, 25% to 32% iron, 18% to 25% chromium, 3.0% to 4.5% aluminum, 0.2% to 0.6% titanium, 0.2% to 0.43% silicon, up to 0.5% manganese and the balance nickel plus impurities. The Al+Ti content should be between 3.4 and 4.2 and the Cr/Al ratio should be from about 4.5 to 8.

1 Claim, 4 Drawing Sheets

1400°F tensile elongation as a function of Al + Ti content.

1400°F tensile elongation as a function of Cr/Al ratio

Average metal affected as a function of Cr/Al ratio for 1800°F Static oxidation tests.

Effect of silicon content on 1400°F tensile elongation.

WELDABLE OXIDATION RESISTANT NICKEL-IRON-CHROMIUM ALUMINUM ALLOY

CROSS-REFERENCE TO RELATED APPLICATION

This is a continuation-in-part of U.S. patent application Ser. No. 12/001,528 filed Dec. 12, 2007, now U.S. Pat. No. 8,506,883.

FIELD OF INVENTION

The invention relates to nickel base corrosion resistant alloys containing chromium aluminum and iron.

BACKGROUND OF THE INVENTION

There are many corrosion resistant nickel-base alloys containing chromium and other elements selected to provide corrosion resistance in particular corrosive environments. These alloys also contain elements selected to provide desired mechanical properties such as tensile strength and ductility. Many of these alloys perform well in some environments and poorly in other corrosive environments. Some alloys which have excellent corrosion resistance are difficult to form or weld. Consequently, the art has continually tried to develop alloys having a combination of corrosion resistance and workability which enables the alloy to be easily formed into vessels, piping and other components that have a long service life.

British Patent No. 1,512,984 discloses a nickel-base alloy with nominally 8-25% chromium, 2.5-8% aluminum and up to 0.04% yttrium that is made by electroslag remelting an electrode that must contain more than 0.02% yttrium. U.S. Pat. No. 4,671,931 teaches the use of 4 to 6 percent aluminum in a nickel-chromium-aluminum alloy to achieve outstanding oxidation resistance by the formation of an alumina rich protective scale. Oxidation resistance is also enhanced by the addition of yttrium to the alloy. The iron content is limited to 8% maximum. The high aluminum results in the precipitation of $Ni_3Al$ gamma prime precipitates which offers good strength at high temperature, especially around 1400° F. U.S. Pat. No. 4,460,542 describes an yttrium-free nickel-base alloy containing 14-18% chromium, 1.5-8% iron, 0.005-0.2% zirconium, 4.1-6% aluminum and very little yttrium not exceeding 0.04%. with excellent oxidation resistance. An alloy within the scope of this patent has been commercialized as HAYNES® 214® alloy. This alloy contains 14-18% chromium, 4.5% aluminum, 3% iron, 0.04% carbon, 0.03% zirconium, 0.01% yttrium, 0.004% boron and the balance nickel.

Yoshitaka et al. in Japanese Patent No. 06271993 describe an iron-base alloy containing 20-60% nickel, 15-35% chromium and 2.5-6.0% aluminum which requires less than 0.15% silicon and less than 0.2% titanium.

European Patent No. 549 286 discloses a nickel-iron-chromium alloy in which there must be 0.045-0.3% yttrium. The high levels of yttrium required not only make the alloy expensive, but they can also render the alloy incapable of being manufactured in wrought form due to the formation of nickel-yttrium compounds which promote cracking during hot working operations.

U.S. Pat. No. 5,660,938 discloses an iron-base alloy with 30-49% nickel, 13-18% chromium, 1.6-3.0% aluminum and 1.5-8% of one or more elements of Groups IVa and Va. This alloy contains insufficient aluminum and chromium to assure that a protective aluminum oxide film is formed during exposure to high temperature oxidizing conditions. Further, elements from Groups IVa and Va can promote gamma-prime formation which reduces high temperature ductility. Elements such as zirconium can also promote severe hot cracking of welds during solidification.

U.S. Pat. No. 5,980,821 discloses an alloy which contains only 8-11% iron and 1.8-2.4% aluminum and requires 0.01-0.15% yttrium and 0.01-0.20% zirconium.

Unfortunately, the alloys disclosed in the aforementioned patents suffer from a number of welding and forming problems brought on by the very presence of aluminum particularly when present as 4 to 6 percent of the alloy. The precipitation of $Ni_3Al$ gamma prime phase can occur quickly in these alloys during cooling from the final annealing operation, resulting in relatively high room temperature yield strengths with corresponding low ductility even in the annealed condition. This makes bending and forming more difficult compared to solid solution strengthened nickel base alloys. The high aluminum content also contributes to strain age cracking problems during welding and post-weld heat treatment. These alloys are also prone to solidification cracking during welding, and, in fact, a modified chemistry filler metal is required to weld the commercial alloy, known as HAYNES® 214® alloy. These problems have hindered the development of welded tubular products and have restricted the market growth of this alloy.

SUMMARY OF THIS INVENTION

The alloy of the present invention overcomes these problems by reducing the negative impact of the gamma-prime on high temperature ductility through large additions of iron in the 25-32% range and reductions in the aluminum+titanium levels to the 3.4-4.2% range. Further, yttrium additions are not required and can be substituted by additions of misch metal.

We overcome disadvantages the Ni—Cr—Al—Y alloys described in the background section by modifying the prior art compositions to displace nickel with a much higher level of iron. In addition, we lower the aluminum level, preferably to about 3.8% from the current 4.5% typical amount of 214 alloy. That lowering reduces the volume fraction of gamma-prime that could precipitate in the alloy and improves the alloy's resistance to strain-age cracking. This enables better manufacturability for the production of tubular products as well as better weld fabricability for end-users. We also increased the chromium level of the alloy to about 18-25% to ensure adequate oxidation resistance at the reduced aluminum level. Small amounts of silicon and manganese are also added to improve oxidation resistance.

We provide a nickel base alloy containing by weight 25-30% iron, 18-25% chromium, 3.0-4.5% aluminum, 0.2-0.6% titanium, 0.2-0.43% silicon and 0.2-0.5% manganese. The alloy may also contain yttrium, cerium and lanthanum in amounts up to 0.01% as well as up to 2.0% cobalt, up to 0.5% molybdenum up to 0.5% tungsten and up to 0.01% magnesium. Carbon may be present in an amount up to 0.25%. Boron may be in the alloy up to 0.004%, zirconium may be present up to 0.025%. The balance of the alloy is nickel plus impurities. In addition, the total content of aluminum plus titanium should be between 3.4% and 4.2% and the ratio of chromium to aluminum should be from about 4.5 to 8.

We prefer to provide an alloy composition containing 26.8-31.8% iron, 18.9-24.3% chromium, 3.1-3.9% aluminum, 0.3-0.4% titanium, 0.2-0.35% silicon, up to 0.5% manganese, up to 0.005% of each of yttrium, cerium and lanthanum, up to 0.06% carbon, less than 0.002% boron, less than 0.001% zirconium and the balance nickel plus impurities. We also prefer that the total aluminum plus titanium be between 3.4% and 4.3% and that the chromium to aluminum ratio be from 5.0 to 7.0.

Our most preferred composition contains 27.5% iron, 20% chromium, 3.75% aluminum, 0.25% titanium, 0.05% carbon, 0.3% silicon, 0.3% manganese, trace amounts of cerium and lanthanum and the balance nickel plus impurities.

These alloys possess good oxidation resistance of not more than 0.3 mils average metal affected when tested for at least 1000 hours at 1800° F. Their tensile yield strength is greater than 50 ksi at 1400° F. Their tensile elongation is greater than 6% and, for some embodiments, the tensile elongation is greater than 10%.

Other preferred compositions and advantages of our alloy will become apparent from the description of the preferred embodiments and test data reported herein.

DESCRIPTION OF THE PREFERRED EMBODIMENTS

Figure 1:
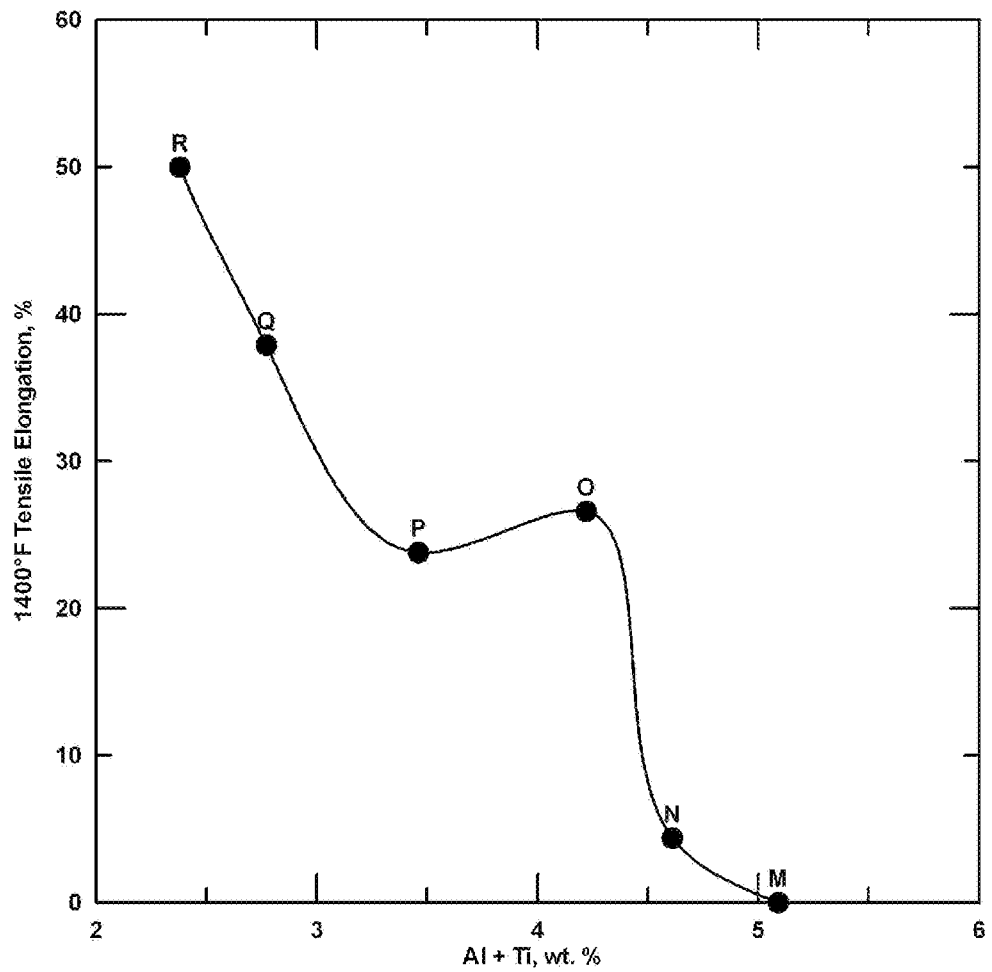
FIG. 1 is a graph showing tensile elongation at 1400° F. as a function of Al+Ti content.

Five fifty-pound heats were VIM melted, ESR remelted, forged and hot rolled at 2150° F. to 0.188" plate, cold rolled to 0.063 thick sheet, and annealed at 2000° F.

The five alloys had the chemical compositions shown in Table I:

TABLE I

Composition, weight %

| | Heat A | Heat B | Heat C | Heat D | Heat E |
|---|---|---|---|---|---|
| Ni | 52.39 | 61.44 | 55.84 | 60.07 | 50.00 |
| Fe | 24.63 | 14.00 | 20.04 | 15.19 | 25.05 |
| Al | 3.0 | 3.28 | 3.49 | 4.06 | 3.86 |
| Cr | 19.50 | 19.67 | 19.72 | 19.86 | 19.51 |
| C | 0.047 | 0.049 | 0.046 | 0.05 | 0.051 |
| B | 0.004 | 0.004 | 0.003 | 0.005 | 0.004 |
| Zr | 0.02 | 0.05 | 0.05 | 0.02 | 0.02 |
| Mn | 0.23 | 0.23 | 0.23 | 0.23 | 0.24 |
| Si | 0.009 | 0.003 | 0.015 | 0.010 | 0.028 |
| Y | 0.001 | 0.008 | 0.005 | 0.007 | 0.006 |

We evaluated samples of these alloys and a commercial heat of 214 alloy using static oxidation testing at 1800° F., and a controlled heating rate tensile (CHRT) test to measure mechanical properties. The controlled heating rate test was intended to be a tool to discern susceptibility of an alloy to strain age cracking. Alloys which result in very low percent elongation at the mid-range ductility minimum are deemed more prone to strain age cracking.

The results of the tests are presented in Tables II and III. The results of testing alloys A through E, lead to the conclusion that the E alloy best exemplified an alloy having properties close to what we desired. For example, it possessed 1) 1800° F. oxidation resistance equal to 214 alloy, and 2) 1400° F. CHRT ductility was six times greater than the 214 alloy. The only major deficiency was 1400° F. yield strength (as measured in the CHRT test). It was well below 214 alloy (44.2 ksi vs. 71.9 ksi).

TABLE II

Results of 1800° F. oxidation tests in flowing air (1008 hours).

| | Heat A | Heat B | Heat C | Heat D | Heat E | 214 alloy control sample |
|---|---|---|---|---|---|---|
| Metal loss Mils/side | 0.06 | 0.07 | 0.05 | 0.05 | 0.04 | 0.04 |
| Avg. internal penetration, mils | 0.16 | 0.45 | 0.33 | 0.35 | 0.15 | 0.19 |
| Avg. Metal affected, mils | 0.22 | 0.52 | 0.38 | 0.40 | 0.19 | 0.23 |

TABLE III

1400° F. Controlled Heating Rate Test (CHRT) tensile test results

| | Heat A | Heat B | Heat C | Heat D | Heat E | 214 alloy |
|---|---|---|---|---|---|---|
| 0.2% YS, ksi | 32.2 | 48.5 | 47.2 | 53.2 | 44.2 | 71.9 |
| UTS, ksi | 32.9 | 55.5 | 51.3 | 61.4 | 48.9 | 87.1 |
| elongation, % | 104 | 35 | 40 | 23.5 | 49.3 | 7.2 |

Three more experimental heats were melted and processed to sheet in order to develop methods of improving the 1400° F. yield strength by the addition of small amounts of Group Vb elements to refine the grain size. The experimental heats were processed to 0.125" thick sheet which was annealed at 2050° F. in order to obtain a finer grain size than the heats of Example 1. The three alloy nominal compositions are shown in Table IV.

TABLE IV

Composition of experimental heats, weight %.

| Element | Heat F | Heat G | Heat H |
|---|---|---|---|
| Ni | 45.86 | 45.68 | 45.6 |
| Fe | 29.61 | 30.32 | 29.87 |
| Al | 3.66 | 3.69 | 3.91 |
| Cr | 19.73 | 19.53 | 19.81 |
| C | 0.056 | 0.059 | 0.054 |
| B | 0.004 | 0.004 | 0.004 |
| Zr | 0.02 | 0.02 | 0.02 |
| Mn | 0.20 | 0.20 | 0.19 |
| Si | 0.27 | 0.27 | 0.27 |
| Y | <0.005 | <0.005 | <0.005 |
| Ti | — | 0.26 | — |
| V | — | — | 0.20 |

Alloy F had no addition of a grain refiner, alloy G had a titanium aim of 0.3% and alloy H contained a vanadium addition (0.3% aim). An intentional silicon addition was also made to these alloys. The alloys were tested in a manner similar to alloys A-E except standard 1400° F. tensile tests were conducted in lieu of the more time consuming CHRT testing. The results are shown in Tables V and VI.

TABLE V

Results of 1800° F. oxidation tests in flowing air (1008 hours)

|  | Heat F | Heat G | Heat H | 214 alloy |
|---|---|---|---|---|
| Metal loss Mils/side | 0.10 | 0.05 | 0.08 | 0.04 |
| Avg. internal penetration, mils | 0.66 | 0.38 | 0.58 | 0.39 |
| Avg. Metal affected, mils | 0.75 | 0.43 | 0.63 | 0.43 |

TABLE VI

1400° F. tensile test results.

|  | Heat F | Heat G | Heat H | 214 alloy |
|---|---|---|---|---|
| 0.2% YS, ksi | 45.9 | 57.8 | 50.1 | 80 |
| U.T.S., ksi | 57.4 | 70.9 | 59.8 | 102 |
| Elongation, % | 60.3 | 30.8 | 49.0 | 17 |

The results for the alloys indicated greater 1800° F. oxidation attack than for alloy E, and the 1400° F. yield strength of alloy G was greater than that of alloy E. None of these alloy compositions had all of the desired properties of less than 0.3 mils average metal affected at 1800° F. in an oxidizing environment for 1000 hours and tensile strength greater than 50 ksi at 1400° F. All of the tested alloys had tensile elongation greater than 6%.

Another series of experimental compositions with a base chemistry between alloy E and alloy G were melted and processed to sheet in a manner similar to the prior examples. The basic compositional aim was an alloy consisting of Ni-27.5Fe-19.5Cr-3.8Al. Intentional yttrium additions typically added to the alloy disclosed in U.S. Pat. No. 4,671,931 for enhanced oxidation resistance were not made. All experimental heats in this group, however, did have a fixed addition of misch-metal to introduce trace amounts of rare earth elements (principally cerium and lanthanum). Titanium was added in small amounts to alloy G and showed promise as a way to boost 1400° F. yield strength. For three of the four alloys in example 3, the titanium was increased from about 0.25% to 0.45%. The silicon level was also varied. Two of the heats had no intentional silicon addition, while the other heats had intentional silicon contents of about 0.3%. The compositions of the experimental heats are given in Table VII. Results of the evaluations are presented in Tables VIII, IX and X.

TABLE VII

Compositions of experimental heats, weight %.

| Element | Heat I | Heat J | Heat K | Heat L |
|---|---|---|---|---|
| Ni | 49.02 | 49.11 | 48.34 | 49.05 |
| Fe | 27.73 | 27.38 | 27.52 | 27.28 |
| Al | 3.80 | 3.99 | 3.87 | 4.00 |
| Cr | 19.22 | 19.31 | 19.42 | 19.00 |
| C | 0.05 | 0.048 | 0.051 | 0.051 |
| B | <0.002 | <0.002 | <0.002 | 0.004 |
| Zr | <0.01 | <0.01 | <0.01 | 0.02 |
| Mn | 0.20 | 0.21 | 0.18 | 0.20 |
| Si | 0.31 | 0.02 | 0.29 | 0.02 |
| Ti | 0.03 | 0.46 | 0.43 | 0.41 |
| Y | <0.005 | <0.005 | <0.005 | <0.005 |
| Ce | 0.006 | <0.005 | <0.005 | <0.005 |
| La | <0.005 | <0.005 | <0.005 | <0.005 |

TABLE VIII

Results of 1800° F. oxidation tests in flowing air (1008 hours)

|  | Heat I | Heat J | Heat K | Heat L | 214 alloy control |
|---|---|---|---|---|---|
| Avg. internal penetration, mils | 0.29 | 0.06 | 0.11 | 0.51 | 0.39 |
| Avg. Metal affected, mils | 0.29 | 0.09 | 0.14 | 0.54 | 0.43 |

TABLE IX

1400° F. tensile test results.

|  | Heat I | Heat J | Heat K | Heat L | 214 alloy |
|---|---|---|---|---|---|
| 0.2% YS, ksi | 43.8 | 59.0 | 59.9 | 61.8 | 80 |
| U.T.S, ksi | 56.4 | 69.2 | 71.0 | 72.0 | 102 |
| Elongation, % | 38.8 | 8.4 | 16.4 | 15.9 | 17 |

The 1400° F. tensile data reveal some significant effects. The ductility dropped from 38% for alloy I (3.8% Al and no titanium) to levels of 8 to 16% for the other 3 alloys (J, K and L), containing about 3.9 to 4.0% Al plus 0.45% titanium. This indicated that the Ni—Fe—Cr—Al alloy of this invention was sensitive to the total aluminum plus titanium content (gamma prime forming elements). Low ductility values in the 1400° F. range are indicative of gamma prime precipitation.

The 1800° F. oxidation test results were encouraging. The average metal affected results indicated that the oxidation resistance was generally better than alloy G. Alloy J, for example, had very scant internal oxidation and had the best 1800° F. oxidation performance (0.09 mils) of all the experimental alloys tested.

Samples of the experimental heats were also tested in a dynamic oxidation test rig. This is a test in which the samples are held in a rotating carousel which is exposed to combustion gases with a velocity of about Mach 0.3. Every 30 minutes, the carousel was cycled out of the combustion zone and cooled by an air blower to a temperature less than about 300° F. The carousel was then raised back into the combustion zone for another 30 minutes. The test lasted for 1000 hours or 2000 cycles. At the conclusion of the test, the samples were evaluated for metal loss and internal oxidation attack using metallographic techniques. The results are presented in Table X. Surprisingly, under dynamic test conditions, alloy J behaved poorly and in fact had to be pulled from the test after completion of 889 hours. The test samples showed signs of deterioration of the protective oxide scale as did samples from alloy L. Recalling the experimental design of alloys I through L, the addition of silicon (0.3%) was one of the variables. Alloys J and L were melted without any intentional silicon addition, whereas alloys I and K had an intentional silicon addition. It would appear then, that there is a distinct beneficial effect of silicon addition on dynamic oxidation resistance. In static oxidation, all the results were less than 0.6 mils, and the test was less discerning than the dynamic test. Furthermore, the results for alloys I and K had average metal affected values less than the 214 alloy control sample in the same test run. Only alloy K possessed all of the properties we are seeking.

TABLE X

Results of dynamic oxidation testing at 1800° F./1000 hours.

|  | Heat I | Heat J | Heat K | Heat L | 214 alloy control |
|---|---|---|---|---|---|
| Metal loss Mils/side | 1.0 | 2.3 | 0.9 | 1.4 | 1.3 |
| Avg internal pen., mils | 0.7 | 5.2 | 0.0 | 2.0 | 1.1 |
| Avg Metal affected, mils | 1.7 | 7.5[1] | 0.9 | 3.4 | 2.4 |

[1]wide variation observed in the duplicate samples (e.g. 11.1 and 3.9 mils) both samples began to deteriorate and were pulled after 889 hours A series of six experimental alloys were melted and processed to explore the effect of increasing chromium levels while simultaneously decreasing the aluminum levels at a constant iron level. A seventh heat was melted to explore high levels of iron and chromium. These alloy compositions were cold rolled into sheet form and given an annealing treatment at 2075° F./15 minutes/water quench. The aim compositions are shown in Table XI. Results of the evaluations are shown in Tables XII and XIII. The yield strength tended to increase with Al+Ti, which was not unexpected. It would appear that the optimum alloy would require greater than about 3.8% Al+Ti in order to achieve 1400° F. strength levels greater than 50 Ksi, but a total as low as 3.4 is acceptable as evidenced by the performance of alloy P. Alloys O, P and S all had the properties we were seeking.

TABLE XI

Compositions of the experimental alloys, weight %.

| Element (wt %) | Heat M | Heat N | Heat O | Heat P | Heat Q | Heat R | Heat S |
|---|---|---|---|---|---|---|---|
| Ni | 51.07 | 49.61 | 47.18 | 47.13 | 45.58 | 44.08 | 39.32 |
| Cr | 15.98 | 18.04 | 20.2 | 21.86 | 23.94 | 25.9 | 24.26 |
| Fe | 26.78 | 26.92 | 27.55 | 26.86 | 26.95 | 26.86 | 31.8 |
| Al | 4.73 | 4.27 | 3.87 | 3.12 | 2.45 | 2.06 | 3.53 |
| Ti | 0.36 | 0.34 | 0.35 | 0.34 | 0.32 | 0.32 | 0.32 |
| Mn | 0.26 | 0.25 | 0.26 | <0.01 | 0.27 | 0.26 | 0.26 |
| Si | 0.32 | 0.28 | 0.32 | 0.33 | 0.33 | 0.31 | 0.27 |
| C | 0.054 | 0.06 | 0.06 | 0.06 | 0.06 | 0.05 | 0.05 |
| Y | <0.002 | <0.002 | <0.002 | <0.002 | <0.002 | <0.002 | <0.002 |
| Ce | <0.005 | 0.006 | <0.005 | <0.005 | 0.005 | 0.008 | 0.008 |
| Al + Ti | 5.09 | 4.61 | 4.22 | 3.46 | 2.77 | 2.38 | 3.85 |
| Cr/Al | 3.4 | 4.2 | 5.2 | 7.0 | 9.8 | 12.6 | 6.9 |

TABLE XII

Results of 1400° F. tensile tests.

|  | Heat M | Heat N | Heat O | Heat P | Heat Q | Heat R | Heat S |
|---|---|---|---|---|---|---|---|
| 0.2% YS, ksi | 66.1 | 63.0 | 58.2 | 52.3 | 47.0 | 43.4 | 54.9 |
| UTS, ksi | 78.9 | 73.4 | 69.8 | 62.7 | 56.5 | 52.7 | 64.6 |
| Elongation, % | 0** | 4.4 | 26.6 | 23.8 | 37.9 | 50.0 | 38.8 |

**both samples broke in the gauge marks, the adjusted gauge length values averaged 3.7%

Figure 2:
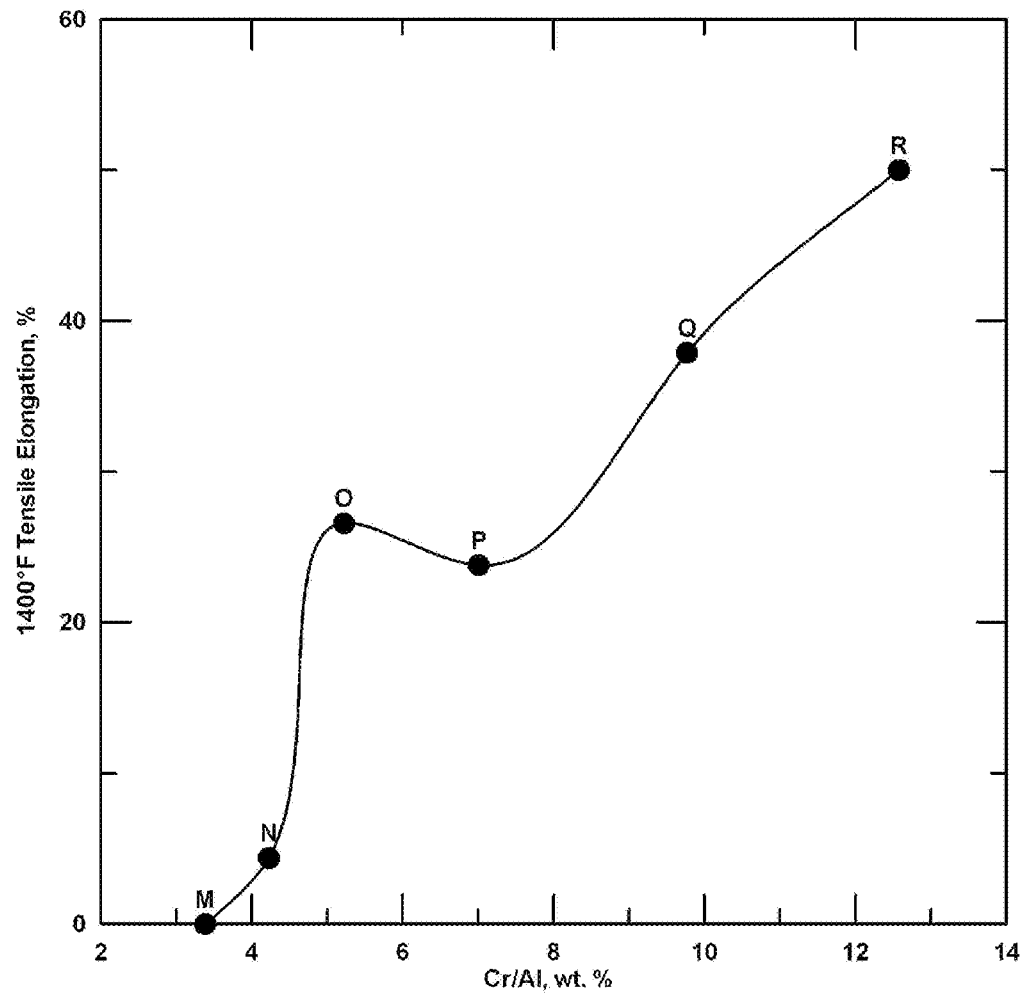
FIG. 2 is a graph showing tensile elongation 1400° F. as a function of Cr/Al ratio.

The 1400° F. tensile ductility data for six experimental alloys (increasing chromium with decreasing aluminum) with a constant iron level is plotted in FIG. 1 versus combined aluminum and titanium content. The 1400° F. tensile elongation tended to decrease with increasing Al+Ti with a rapid drop off in ductility when Al+Ti exceeded about 4.22%. Hence, a critical upper limit of 4.22% Al+Ti is defined for the best balance in elevated temperature properties (i.e. high strength and good ductility). From alloy S we conclude that the optimum alloy would require greater than about 3.8% Al+Ti in order to achieve adequate 1400° F. yield strength, but less than 4.22% Al+Ti, in order to maintain adequate ductility. A plot of 1400° F. tensile ductility versus Cr/Al ratio for the experimental alloys in Table XI is shown in FIG. 2, illustrating the effect of increasing Cr/Al ratio. Good ductility is indicated when the Cr/Al ratio is greater than about 4.5. This ratio appeared to apply to alloy S as well even though it had a higher level of iron.

Figure 3:
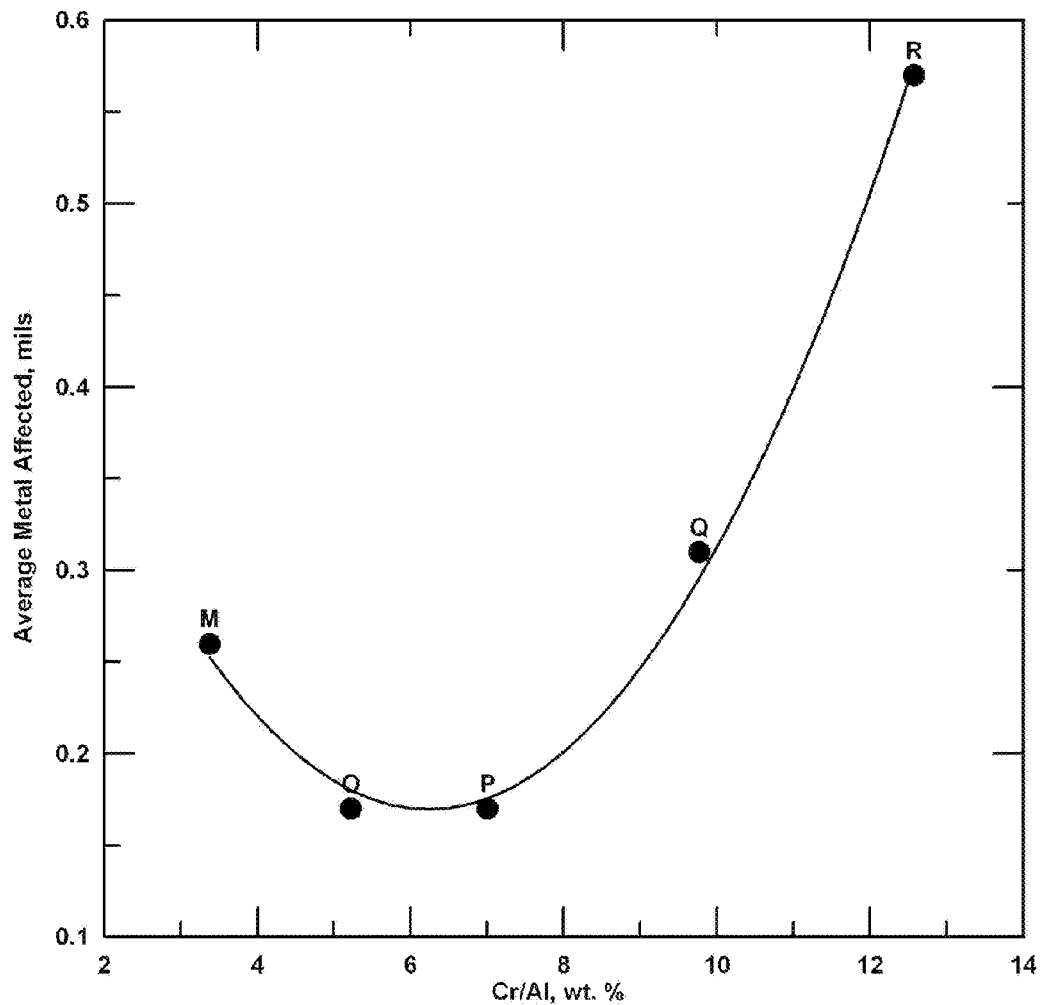
FIG. 3 is a graph showing the average amount of metal affected as a function of Cr/Al ratio in static condition test at 1800° F.

The 1800° F. static oxidation test results are shown in Table XIII and plotted in FIG. 3 as a function of Cr/Al ratio at a constant iron level. The values obtained for alloy N were erratic, and, therefore, are not included in the table. The dramatic effect of the Cr/Al ratio is clear from the figure. The best oxidation resistance was obtained when the ratio was between about 4.5 to 8. The oxidation resistance of alloy S was not as good as the heats with Cr/Al values within this range probably due to its higher iron content. However, it did have oxidation resistance as good as the 214 alloy shown in Table V.

TABLE XIII

Results of 1800° F. static oxidation tests.

|  | Heat M | Heat O | Heat P | Heat Q | Heat R | Heat S |
|---|---|---|---|---|---|---|
| Metal Loss, mils | 0.04 | 0.03 | 0.06 | 0.05 | 0.08 | 0.03 |

TABLE XIII-continued

Results of 1800° F. static oxidation tests.

|  | Heat M | Heat O | Heat P | Heat Q | Heat R | Heat S |
|---|---|---|---|---|---|---|
| Avg. internal penetration | 0.15 | 0.14 | 0.11 | 0.26 | 0.49 | 0.36 |
| Avg. metal affected, mils | 0.26 | 0.17 | 0.17 | 0.31 | 0.57 | 0.39 |

Three additional alloy compositions (Heat T, U and V) were produced. Their compositions are shown in Table XIV. Heat T had a composition close to Heat J in Table VII, an alloy close to the preferred embodiment of this invention, but the Al+Ti content was lower, and the Cr/Al ratio was slightly higher. A small addition of silicon was made to alloy T, whereas no silicon was added to alloy J. Samples of cold rolled sheet of Heat T were subjected to a 2100° F./15 minute anneal/RAC. Duplicate tensile tests of Heat T were conducted at room temperature and at elevated temperature from 1000 to 1800° F. in 200 degree increments. The results are presented in Table XV. It was found that from 1000° F., the yield strength increased to a maximum at 1400° F. (57 Ksi) and then dropped rapidly. A mid-range ductility dip was observed at 1200-1400° F., with a minimum ductility of 12% elongation at 1400° F. The 12% elongation was higher than Heat J (8.4%). Alloy T did have all of the desired properties.

TABLE XIV

Composition for alloys T, U and V weight %.

| Element | Heat T | Heat U | Heat V |
|---|---|---|---|
| Ni | 48.78 | 46.00 | 46.24 |
| Cr | 18.94 | 20.00 | 21.15 |
| Fe | 27.3 | 27.5 | 28.0 |
| Al | 3.82 | 3.82 | 3.44 |
| Ti | 0.32 | 0.36 | 0.34 |
| Al + Ti | 4.14 | 4.18 | 3.78 |
| Si | 0.21 | 0.32 | 0.41 |
| Mn | 0.21 | 0.33 | 0.35 |
| C | 0.06 | 0.051 | 0.042 |
| Y | <0.002 | 0 | 0 |
| Ce | <0.005 | 0 | 0 |
| La | <0.005 | <0.005 | <0.005 |
| Co | — | 0.38 | <0.05 |
| Mo | — | 0.21 | <0.05 |

TABLE XV

Tensile test results for alloy T.

| Test temperature, (° F.) | 0.2% YS, ksi | UTS, ksi | Elongation, % |
|---|---|---|---|
| Room | 42.6 | 100.9 | 51.1 |
| 1000 | 38.5 | 89.3 | 64.8 |
| 1200 | 52.0 | 76.0 | 18.2 |
| 1400 | 56.9 | 66.5 | 12.0 |
| 1600 | 13.9 | 20.1 | 115.8 |
| 1800 | 6.6 | 9.7 | 118.7 |

Samples of cold rolled sheet of Heats U and V were subjected to a 2100° F./15 minute anneal/RAC. Tensile tests at 1400° F. were also conducted on Heats U and V. The results of those tests are shown in Table XVI.

TABLE XVI

1400° F. tensile test results.

|  | Heat U | Heat V |
|---|---|---|
| 0.2% YS, ksi | 60.5 | 53.8 |
| U.T.S., ksi | 70.2 | 64.2 |
| Elongation, % | 6.3 | 11.0 |

Both Heats U and V had tensile strength greater than 50 ksi. Heat U was also tested for oxidation resistance in flowing air at 1800° F. and performed as follows:
  Metal Loss: 0.05 mils
  Avg. Int. Pen: 0.25 mils
  Avg. Metal Affected: 0.30 mils
These oxidation test results are also acceptable.

Figure 4:
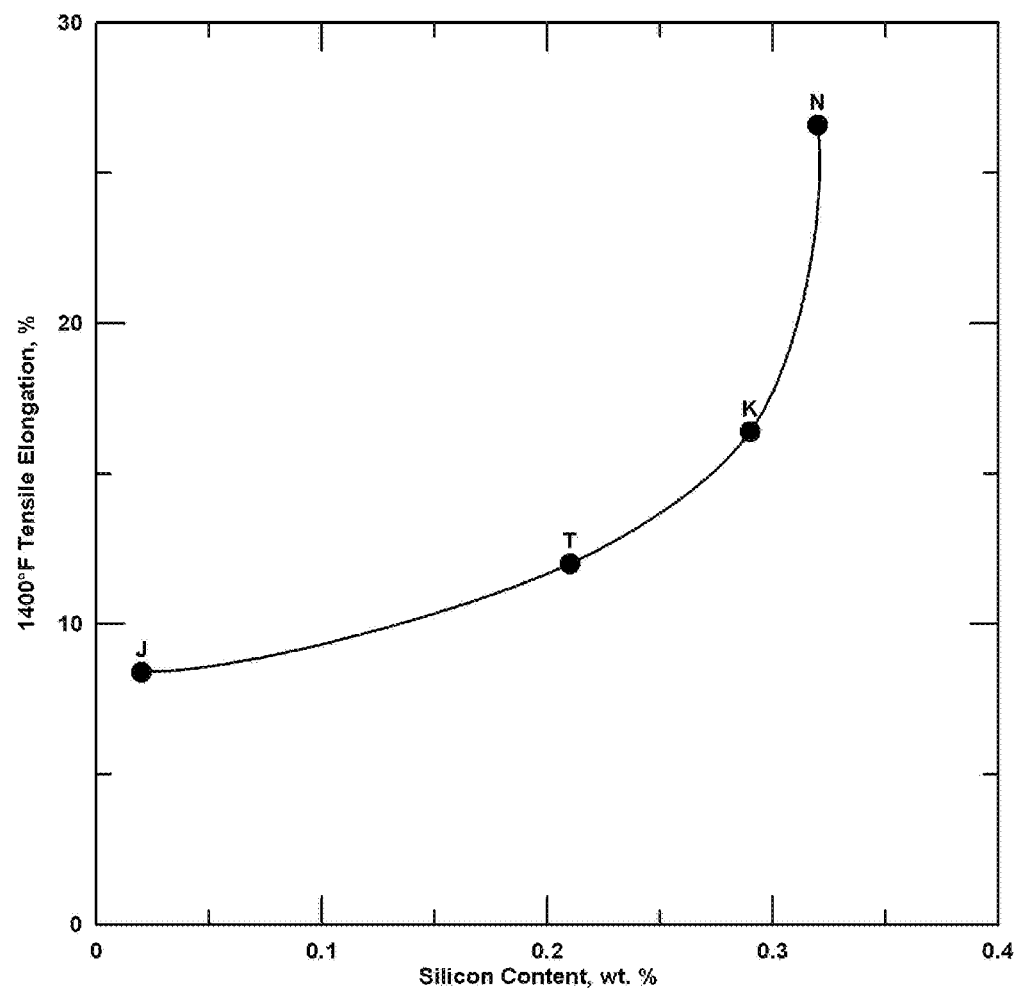
FIG. 4 is a graph showing the effect of silicon content on 1400° F. tensile elongation.

It was of interest to discern why several alloys close to the preferred embodiments of alloys K, O, P, S and T had different 1400° F. ductilities. For example, why was the ductility of Heat N so much higher than for alloys J and T? After focusing on the actual chemical analysis of each heat, it was discovered that silicon additions were beneficial to the 1400° F. ductility in alloys containing Al+Ti contents in the range of 3.8% to 4.2%. Referring to the 4 experimental heats in Table VII, it should be noted that alloy K was melted as the silicon containing counterpart to "no silicon" alloy J. The silicon content of alloy K was 0.29% and its 1400° F. ductility was 16.4%, twice the value of no silicon alloy J. FIG. 4 is a graph of the 1400° F. % elongation of four alloys with nearly the same composition, and it shows the effect of silicon on improving hot tensile ductility. It clearly indicates that the silicon content should be above about 0.2% for good 1400° F. ductility, and, thereby, good resistance to strain-age cracking. This observation was completely unexpected.

It was suspected that high silicon contents might lead to a weldability problem known as hot cracking, which occurs in the weld metal during solidification. To check for this, samples of experimental Heats J, K, N, and T, which had similar compositions except for silicon contents, were evaluated by subscale varestraint tests. Samples of alloy E that were tested are included to illustrate the negative effects of boron and zirconium. The results are summarized in Table XVII.

TABLE XVII

Subscale Varestraint weldability results: (total crack length at 1.6% augmented Strain). Values reported in mils are an average of two tests.

|  | Heat J | Heat T | Heat K | Heat N | Heat E | Ref. 2 alloy |
|---|---|---|---|---|---|---|
| % Si | 0.02 | 0.21 | 0.29 | 0.32 | 0.028 | NA |
| B, Zr, % | — | — | — | — | 0.004, 0.02 | NA |
| Avg. total crack length, mils | 78 | 77 | 80 | 109 | 153 | 171 |

The data indicates that there was no adverse effect of silicon additions up to 0.29%. When the silicon content was above about 0.3%, the hot crack sensitivity increased by about 40%. It was observed, however, that the hot crack sensitivity of alloy N was still much less than 214 alloy. The results for alloy E indicate that the presence of boron and zirconium have a negative impact on hot cracking sensitivity. These elements are typically added to the 214 alloy. If these elements were left out of alloy E, and additions of 0.2 to 0.6 titanium and 0.2 to 0.4 silicon were made, then it is expected that the resulting alloy would have good resistance to hot cracking and all of the attributes claimed in this invention. This modified alloy E would contain 25.05% iron, 3.86% aluminum, 19.51% chromium, 0.05% carbon, less than 0.025% zirconium, 0.2-0.4% silicon, 0.2-0.6% titanium, less than 0.005% of each of yttrium, cerium and lanthanum and the balance nickel plus impurities.

TABLE XVIII

Alloys Have Desired Properties

|  | Modified Heat E | Heat K | Heat O | Heat P | Heat S | Heat T | Heat U | Heat V |
|---|---|---|---|---|---|---|---|---|
| Ni | bal. | 48.34 | 47.18 | 47.13 | 39.32 | 48.78 | 46.00 | 46.24 |
| Fe | 25.05 | 27.52 | 27.55 | 26.86 | 31.8 | 27.3 | 27.5 | 28.0 |

TABLE XVIII-continued

Alloys Have Desired Properties

|    | Modified Heat E | Heat K  | Heat O  | Heat P  | Heat S  | Heat T  | Heat U  | Heat V  |
|----|-----------------|---------|---------|---------|---------|---------|---------|---------|
| Al | 3.86            | 3.87    | 3.87    | 3.12    | 3.53    | 3.82    | 3.82    | 3.44    |
| Cr | 19.51           | 19.42   | 20.2    | 21.86   | 24.26   | 18.94   | 20.00   | 21.15   |
| C  | 0.05            | 0.051   | 0.06    | 0.06    | 0.05    | 0.06    | 0.051   | 0.042   |
| B  |                 | <0.002  | —       | —       | —       | —       | <0.002  | <0.002  |
| Zr | <0.025          | <0.01   | —       | —       | —       | —       | <0.01   | <0.01   |
| Mn |                 | 0.18    | 0.26    | <0.01   | 0.26    | 0.21    | 0.33    | 0.35    |
| Si | 0.3             | 0.29    | 0.32    | 0.33    | 0.27    | 0.21    | 0.32    | 0.41    |
| Ti | 0.5             | 0.43    | 0.35    | 0.34    | 0.32    | 0.32    | 0.35    | 0.34    |
| Y  | <0.005          | <0.005  | <0.002  | <0.002  | <0.002  | <0.005  | —       | —       |
| Ce | <0.005          | <0.005  | <0.005  | <0.005  | 0.008   | <0.005  | <0.05   | <0.05   |
| La | <0.005          | <0.005  | —       | —       | —       | <0.005  | 0.005   | <0.005  |
| Al + Ti | 4.06-4.26  | 3.83    | 4.22    | 3.46    | 3.85    | 4.14    | 4.18    | 3.78    |
| Cr/Al | 5.0          | 5.0     | 5.2     | 7.0     | 6.8     | 5.0     | 5.24    | 6.15    |

— Not Measured

Table XVIII contains the tested alloys having the desired properties and the composition of each alloy along with the modified Heat E. From this table and the figures we conclude that the desired properties can be obtained in an alloy containing 25-32% iron, 18-25% chromium, 3.0-4.5% aluminum, 0.3-0.6% titanium, 0.2-0.4% silicon and 0.2-0.5% manganese. The alloy may also contain yttrium, cerium and lanthanum in amounts up to 0.01%. Carbon may be present in an amount up to 0.25%, but typically will be present at a level less than 0.10%. Boron may be in the alloy up to 0.004%, and zirconium may be present up to 0.025%. Magnesium may be present up to 0.01%. Trace amounts of niobium up to 0.15% may be present. Each of tungsten and molybdenum may be present in an amount up to 0.5%. Up to 2.0% cobalt may be present in the alloy. The balance of the alloy is nickel plus impurities. In addition, the total content of aluminum plus titanium should be between 3.4% and 4.2% and the ratio of chromium to aluminum should be from about 4.5 to 8. However, more desirable properties will be found in alloys having a composition of 26.8-31.8% iron, 18.9-24.3% chromium, 3.1-3.9% aluminum, 0.3-0.4% titanium, 0.25-0.35% silicon, up to 0.35 manganese, up to 0.005% of each of yttrium, cerium and lanthanum, up to 0.06 carbon, less than 0.004 boron, less than 0.01 zirconium and the balance nickel plus impurities. We also prefer that the total aluminum plus titanium be between 3.4% and 4.2% and that the chromium to aluminum ratio be from 5.0 to 7.0.

Manganese provides oxidation resistance and is likely to be present in the raw materials from which this alloy will be made. All of the tested heats except alloy P contained manganese in the range 0.18 to 0.35. Based upon experience with other nickel base alloys, this alloy may contain up to 0.5% Mn with a preferred range of 0.2 to 0.5%.

We concluded that the optimum alloy composition to achieve the desired properties would contain 27.5% iron, 20% chromium, 3.75% aluminum, 0.25% titanium, 0.05% carbon, 0.3% silicon, 0.25% manganese, trace amounts of cerium and lanthanum up to 0.015% and the balance nickel plus impurities.

Although we have described certain present preferred embodiments of our alloy, it should be distinctly understood that our alloy is not limited thereto, but may be variously embodied within the scope of the following claims.

We claim:

1. A weldable, high temperature oxidation resistant alloy comprising in weight percent 27.5% iron, 20% chromium, 3.75% aluminum, 0.25% titanium, 0.05% carbon, 0.3% silicon, 0.25% manganese and the balance nickel plus impurities.

* * * * *